United States Patent
Jong et al.

(10) Patent No.: US 12,192,035 B2
(45) Date of Patent: Jan. 7, 2025

(54) FEEDER LINK SYNCHRONIZATION

(71) Applicant: Hughes Network Systems, LLC, Germantown, MD (US)

(72) Inventors: James Jehong Jong, North Potomac, MD (US); Bin Chen, Germantown, VA (US); Tahereh Fazel, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 4 days.

(21) Appl. No.: 18/304,369

(22) Filed: Apr. 21, 2023

(65) Prior Publication Data

US 2024/0048415 A1 Feb. 8, 2024

Related U.S. Application Data

(60) Provisional application No. 63/370,080, filed on Aug. 1, 2022.

(51) Int. Cl.
*H04L 27/00* (2006.01)
*H04B 7/185* (2006.01)

(52) U.S. Cl.
CPC ..... *H04L 27/0014* (2013.01); *H04B 7/18513* (2013.01); *H04B 7/18519* (2013.01); *H04L 2027/0065* (2013.01)

(58) Field of Classification Search
CPC ........ H04L 27/0014; H04L 2027/0065; H04B 7/18513; H04B 7/18519
See application file for complete search history.

(56) References Cited

U.S. PATENT DOCUMENTS 5,455,823 A 10/1995 Noreen et al.
5,790,939 A 8/1998 Malcolm et al.
(Continued)

FOREIGN PATENT DOCUMENTS

WO 9904510 A1 1/1999

OTHER PUBLICATIONS

International Search Report for PCT Application No. PCT/US2023/070796.

*Primary Examiner* — Vineeta S Panwalkar
(74) *Attorney, Agent, or Firm* — Capitol City TechLaw; Jasbir Singh

(57) ABSTRACT

A method for frequency and time synchronization with respect to a satellite, the method including: calculating a frequency offset ($\hat{f}_{B,e}$) due to an instability of a satellite oscillator from a beacon signal ($f_{B,TX}^N$); determining a Satellite Motion Doppler Correction for Ephemeris ($SMDC_e$) of a satellite motion based on ephemeris data for the satellite; computing a Satellite Reference Drift Correction for Ephemeris ($SRDC_e$) based on the frequency offset, the beacon signal and the $SMDC_e$; setting a loopback TX frequency based on the $SMDC_e$ and the $SRDC_e$; and transmitting a loopback TX signal to the satellite at the loopback TX frequency.

20 Claims, 6 Drawing Sheets

(56) References Cited

U.S. PATENT DOCUMENTS

| | | | |
|---|---|---|---|
| 5,861,842 A | 1/1999 | Hitch et al. | |
| 5,878,330 A * | 3/1999 | Naumann | H03J 7/02 |
| | | | 342/402 |
| 9,749,035 B2 * | 8/2017 | Vasavada | H04B 7/1851 |
| 2015/0270890 A1 | 9/2015 | Vasavada et al. | |

* cited by examiner

FEEDER LINK SYNCHRONIZATION

REFERENCE

The present application claims the benefit under 35 U.S.C. 119(e) of U.S. Provisional Application Ser. No. 63/370,080, filed Aug. 1, 2022, which is incorporated herein by reference in its entirety.

FIELD

The present teachings disclose a system and method for synchronizing timing, frequency and frame numbers between ground equipment and a satellite with the use of a satellite beacon, ephemeris data, a loopback signal, and a GNSS source. Improvements to feeder link synchronization and synchronization error handling are also disclosed.

BACKGROUND

In a Time Division Multiple Access (TDMA) system, synchronization ensures arrival of bursts at a nominally centered timing and frequency reference. Without accurate synchronization, the burst transmissions may overlap in time and/or frequency creating interference. Moreover, a receiver may not be able to demodulate the received bursts as the received burst frequency and timing offset are outside of an aperture expected by the receiver. The aperture may be assigned by the TDMA system.

In the present teachings, the satellite does not transmit a PSS equivalent signal. Timing and frequency provided on a satellite serve as references to synchronize the TDMA transmissions between a User Terminal (UT) and a gateway (GW) for many satellite-air interfaces. A feeder link is a link between a GW and a satellite. A mobile link is a link between a UT and a satellite.

In the prior art, a satellite generates a modulated PSS signal and sends it to the GWs serving as a frequency and timing source. The PSS carries a frame number for signaling and message synchronization. The prior art fails to disclose a unified method that uses all of these for accurate and reliable synchronization without a PSS equivalent system.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Various components in the system can introduce frequency errors. The RFT includes an independent GNSS system for use by its components as needed. The GW includes an independent GNSS system. As the GW operates at the IF and baseband frequency rather than Ka-band, absolute frequency error is even smaller than that of RFT. Due to the inclined orbit operation and satellite maneuver, the distance between the satellite and GW varies over time and introduces satellite motion induced Doppler.

In some aspects, the techniques described herein relate to a method for frequency and time synchronization with respect to a satellite, the method including: calculating a frequency offset ($\hat{f}_{B,e}$) due to an instability of a satellite oscillator from a beacon signal ($f_{B,TX}{}^N$); determining a Satellite Motion Doppler Correction for Ephemeris ($SMDC_e$) of a satellite motion based on ephemeris data for the satellite; computing a Satellite Reference Drift Correction for Ephemeris ($SRDC_e$) based on the frequency offset, the beacon signal and the $SMDC_e$; setting a loopback TX frequency based on the $SMDC_e$ and the $SRDC_e$; and transmitting a loopback TX signal to the satellite at the loopback TX frequency.

In some aspects, the techniques described herein relate to a method, wherein the beacon signal includes an unmodulated CW signal.

In some aspects, the techniques described herein relate to a method, wherein the setting further includes setting a loopback RX frequency based on the $SMDC_e$ and the $SRDC_e$.

In some aspects, the techniques described herein relate to a method, further including deriving a satellite to gateway delay ($d_{GS}$), a gateway transmission delay and a receive frame delay from a loopback RX signal transmission time and a corresponding loopback TX signal reception time.

In some aspects, the techniques described herein relate to a method, further including receiving a loopback RX signal based on the loopback TX signal; and estimating an uplink frequency offset and a downlink frequency offset from the loopback RX signal.

In some aspects, the techniques described herein relate to a method, further including updating a Satellite Reference Drift Correction (SRDC) as SRDC' and a Satellite Motion Doppler Correction (SMDC) as SMDC' based on the $SMDC_e$, the $SMDC_e$ and the downlink frequency offset.

In some aspects, the techniques described herein relate to a method, further including adjusting traffic channel RX and TX frequencies based on the SRDC' and the SMDC'.

In some aspects, the techniques described herein relate to a method, further including: generating a timing reference signal at the satellite based on a reference clock from a Global Navigation Satellite System (GNSS) source at a Gateway (GW); and adjusting a transmission timing and a receive timing at the gateway to align signals with a frame boundary referenced at the satellite.

In some aspects, the techniques described herein relate to a method, wherein the adjusting further includes adjusting a loopback transmission timing and a receive loopback timing based on timing estimation measurement results.

In some aspects, the techniques described herein relate to a method, further including generating a GNSS-aligned timecode to derive a system time reference.

In some aspects, the techniques described herein relate to a method, further including deriving a system frame number from the GNSS-aligned timecode to achieve frame number synchronization.

In some aspects, the techniques described herein relate to a method, further including cycling the system frame number based on a hyperframe duration.

In some aspects, the techniques described herein relate to a method, further including calculating the system frame number at the gateway by adjusting for a satellite to gateway transit time and equipment delays for each direction.

In some aspects, the techniques described herein relate to a method, further including multicasting a synchronization message including the system frame number.

In some aspects, the techniques described herein relate to a method, further including interpolating the ephemeris data to a finer granularity.

In some aspects, the techniques described herein relate to a method, wherein the interpolating includes performing a third order Lagrange interpolation and a first order linear interpolation method to improve an accuracy of dGS values derived from the ephemeris data.

In some aspects, the techniques described herein relate to a method, further including following variations of an SNR of a loopback RX signal with a first order filter; and adjusting a loopback transmit power based on the variations of the SNR.

In some aspects, the techniques described herein relate to a method, further including tracking a last good beacon value and last good ephemeris data values; and restoring the last good beacon value when the beacon signal indicates an outage, or the last good ephemeris data values when the ephemeris data indicates an outage.

In some aspects, the techniques described herein relate to a method, wherein the tracking further includes tracking a last good loopback value from a loopback RX signal based on the loopback TX signal, and the restoring further includes restoring the last good loopback value when the loopback RX signal indicates an outage.

In some aspects, the techniques described herein relate to a system to synchronize frequency and time with respect to a satellite, the system including: a beacon receiver to receive a beacon signal ($f_{B,TX}^N$) and to calculate a frequency offset ($\hat{f}_{B,e}$)) due to an instability of a satellite oscillator from the beacon signal; an ephemeris module to determine a Satellite Motion Doppler Correction for Ephemeris ($SMDC_e$) of a satellite motion based on ephemeris data for the satellite; a sync module to compute a Satellite Reference Drift Correction for Ephemeris ($SRDC_e$) based on the frequency offset, the beacon signal and the $SMDC_e$; a loopback transmitter to set a loopback TX frequency based on the and the $SMDC_e$, and to transmit a loopback TX signal to the satellite at the loopback TX frequency; and a loopback receiver to receive a loopback RX signal based on the loopback TX signal, and to estimate an uplink frequency offset and a downlink frequency offset from a loopback RX signal based on the loopback TX signal, wherein the sync module updates a Satellite Reference Drift Correction (SRDC) as SRDC' and a Satellite Motion Doppler Correction (SMDC) as SMDC' using the $SRDC_e$, the $SMDC_e$ and the downlink frequency offset, and the sync module adjusts traffic channel RX and TX frequencies based on SRDC' and SMDC'.

Additional features will be set forth in the description that follows, and in part will be apparent from the description, or may be learned by practice of what is described.

BRIEF DESCRIPTION OF DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
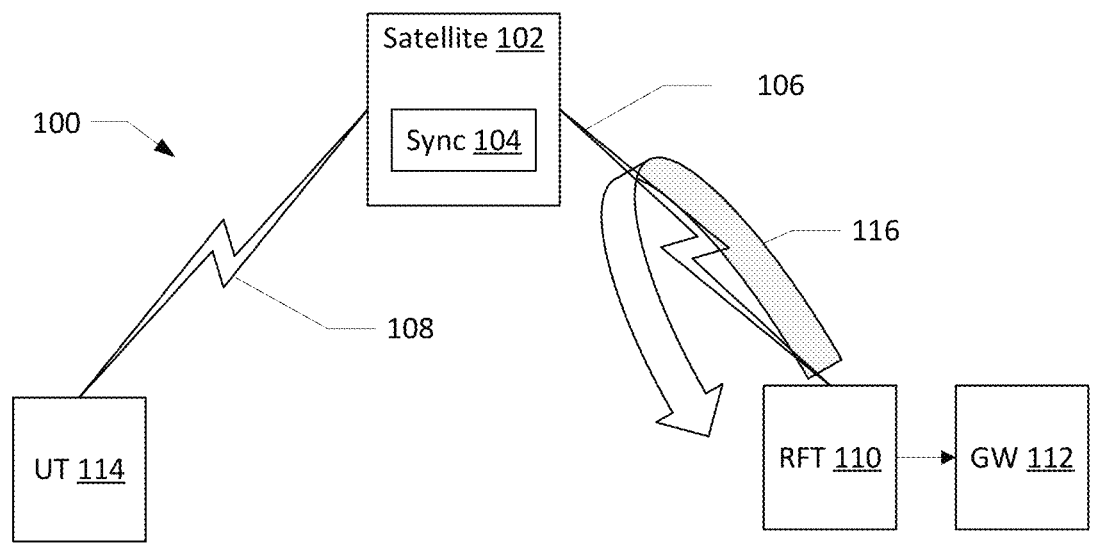
FIG. 1 illustrates a satellite system according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

A satellite TDMA air interface may provide timing and frequency on the satellite to serve as a reference to synchronize TDMA transmissions from UTs and GWs. The satellite TDMA air interface of the present teachings transmits unmodulated CW beacon signals to aid frequency synchronization. In some embodiments, loopback signals to further improve accuracy of synchronization. The mobile link synchronization may include a timing adjustment for the satellite payload delays among different paths. The link between the GW and the Satellite is termed as the feeder link and the link between the user terminals and the satellite is termed as the mobile link.

For timing synchronization, a logical timing reference may be established at the satellite to support the legacy terminals with the GMR-1 air interface. For the legacy terminals, the timing may be derived from a GNSS (for example, GNS) receiver and delay information computed from the satellite's ephemeris data. Similarly, a frame number may be derived from the GNSS time for the legacy terminals.

FIG. 1 illustrates a satellite system according to various embodiments.

A satellite system 100 may include a satellite 102 communicating with a GW 112 via a RFT 110 and a UT 114. Communications between the satellite 102 and the RFT 110 may be via a feeder link 106, for example, in the Ka band. Communications between the satellite 102 and the UT 114 may be via a service link 108, for example, in the L-band. The feeder link 106 may include a loopback signal 116 relayed by a synchronization module 104 disposed in the satellite 102. The relayed loopback signal may be received by a receiver and used for frequency and timing {f,t} synchronization. The loopback signal 116 may be received at the GW 112. The GW 112 may use the received loopback signal to estimate a satellite oscillator frequency and timing drifts. The GW 112 may synchronize a GW oscillator with the satellite oscillator to compensate for the satellite oscillator frequency and timing drifts.

Overall Synchronization Components

Figure 2:
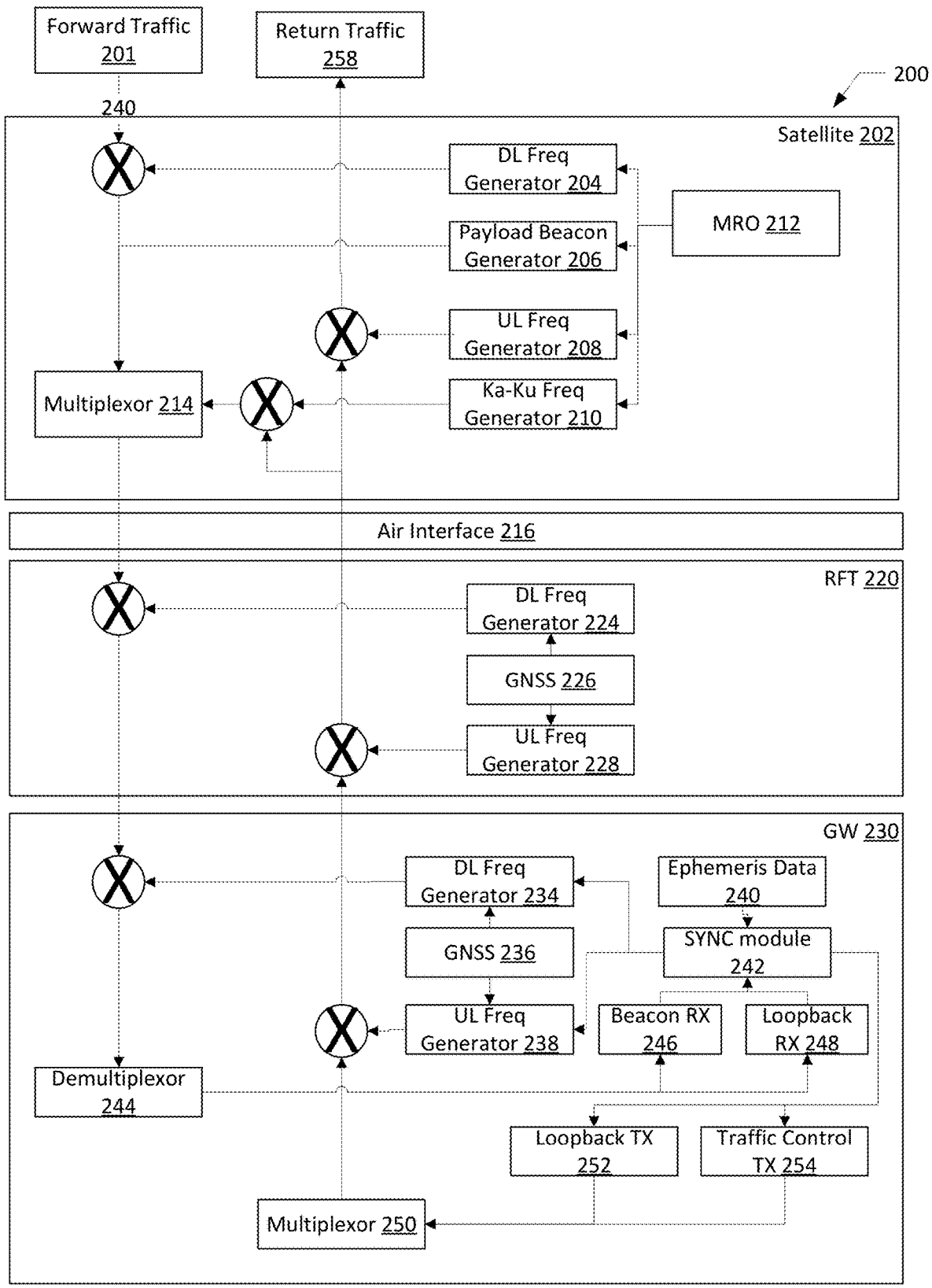
FIG. 2 illustrates a satellite system including a synchronization system for frequency according to various embodiments.

FIG. 2 illustrates a satellite system including a synchronization system according to various embodiments.

A feeder link synchronization system 200 may be implemented across a satellite 202, an air interface 216, an RFT 220 and a GW 230. A forward path refers to a path from the satellite 202 to the GW 230. A return path refers to a path from the GW 230 to the satellite 202.

The satellite 202 may include a MRO 212 that provides a reference clock signal for downlink frequency generator 204, a payload beacon generator 206, a uplink frequency generator 208 and a Ka-Ku frequency generator 210. A signal from the downlink frequency generator 204 may be modulated with a forward traffic 201 and provided to a multiplexor 214. The multiplexor 214 may include signal form the payload beacon generator 206 and the Ka-Ku frequency generator 210 to transmit a signal via the air interface 216 and the RFT 220 to the GW 230. In reverse, the satellite 202 may receive return traffic 258 via the air interface 216 and the RFT 220 from the GW 230. The uplink frequency generator 208 may provide a carrier for the return path.

The RFT 220 may include a downlink frequency generator 224 to provide a carrier for the forward path, a GNSS receiver 226 and an uplink generator 228 to provide a carrier for the return path. The RFT 220 is responsible for transmitting and receiving signals from the satellite 202.

The GW 230 may include a downlink frequency generator 234, a GNSS receiver 236, an uplink frequency generator 238, an ephemeris data module 240, a sync module 242, a demultiplexor 244, a beacon RX 246, a loopback RX 248, a loopback TX 252, a multiplexor 250 and a traffic control 254.

The downlink frequency generator 234 may provide a carrier for the forward path. The uplink frequency generator 238 may provide a carrier for the return path, The beacon RX 246 may receive and process a beacon signal via the forward path. The loopback TX 252 may transmit a loopback signal to the satellite 202 via the return path. The loopback RX 248 may receive the loopback signal from the satellite 202 via the forward path. The demultiplexor 244 may separate and route the loopback signal, the beacon signal, the forward traffic appropriately. The multiplexor 250 may combine the loopback signal and the return traffic.

In some embodiments, the GNSS receiver 236 may be a GNS receiver that provides 10 MHz timing and frequency reference clock. The GNSS receiver 236 may provide a GNSS-aligned system timecode as a signal. The GNSS-aligned system timecode may a reference for timing needs of the feeder link synchronization system 200.

The GW 230 may include an ephemeris data module 240 to provide an Ephemeris availability indication and ephemeris data in batches. The batches may cover increments of time, for example, ephemeris data for the next 5 minutes, next 30 minutes or the like. The batches may include multiple records with ephemeris data per a resolution. The resolution of the records may be every minute, every 1 second or the like. The ephemeris data module 240 may refine the batches with interpolated records for a finer resolution, for example, every 0.5 seconds. The interpolated records may be linearized. The ephemeris data module 240 may store the latest Ephemeris data file downloaded from an Ephemeris file server. In some embodiments, the ephemeris data module 240 may compute the gateway to satellite delay $d_{GS}$ and satellite motion induced Doppler (SMDC) from the Ephemeris data file. The ephemeris data module 240 may send $d_{GS}$ and SMDC results to a sync module 242 periodically.

The sync module 242 provides feeder link time and frequency synchronization. The sync module 242 may generate a Common Frame Reference (CFR) and a frame number from the GNSS-aligned system timecode. On the forward path from the gateway to the satellite, the sync module 242 may compute the time offsets ($T_n$) to advance burst transmission from the gateway to account for the $d_{GS}$ and equipment delays of gateway, RFT and satellite payload so that the bursts arrive at the satellite time aligned with CFR. On the return path from satellite to gateway, the sync module 242 may compute the time offsets ($R_n$) for burst reception to compensate for the $d_{GS}$ and equipment delays of gateway, RFT and satellite payload. The sync module 242 may compute $d_{GS}$ and $d_{GS}$ slope based on loopback transmission and reception time. The sync module 242 may compute the SRDC and SMDC. The sync module 242 may multicast a synchronization message including synchronization parameters, for example, a frame number, $d_{GS}$, Tn, Rn, SMDC, SRDC and the like.

The feeder link synchronization system 200 may include a traffic control 254 to adjust burst transmit and receiving timing based on $T_n$ and $R_n$ received in a synchronization message. The traffic control 254 may adjust burst transmit and receiving timing based on $T_n$ and $R_n$ received in synchronization message. The traffic control 254 may perform Doppler compensation based on SMDC and SRDC received in the synchronization message on forward and return paths. The traffic control 254 may parse the synchronization message and extract the frame number, $d_{GS}$, $T_n$ and Rn to perform control and packet and traffic channel scheduling.

Frequency Error Model

Figure 3A:
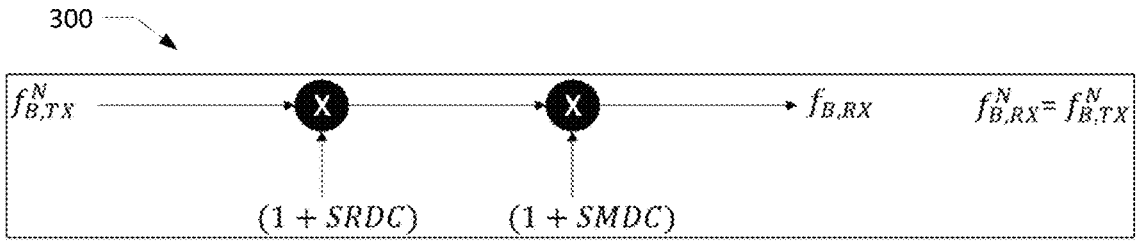
FIG. 3A illustrates a frequency error model of a beacon signal according to various embodiments.

FIG. 3A illustrates a frequency error model of a beacon signal according to various embodiments.

FIG. 3A illustrates a frequency error model 300 of a beacon signal $f_{B,TX}^N$. The beacon signal $f_{B,TX}^N$ may be transmitted by a satellite and received as Rx beacon signal $f_{B,RX}^N$ by a GW with a frequency error. The frequency error includes an MRO error (1+SRDC) and a satellite motion induced Doppler (1+SMDC). Ideally $f_{B,RX}^N = f_{B,TX}^N$.

Figure 3B:
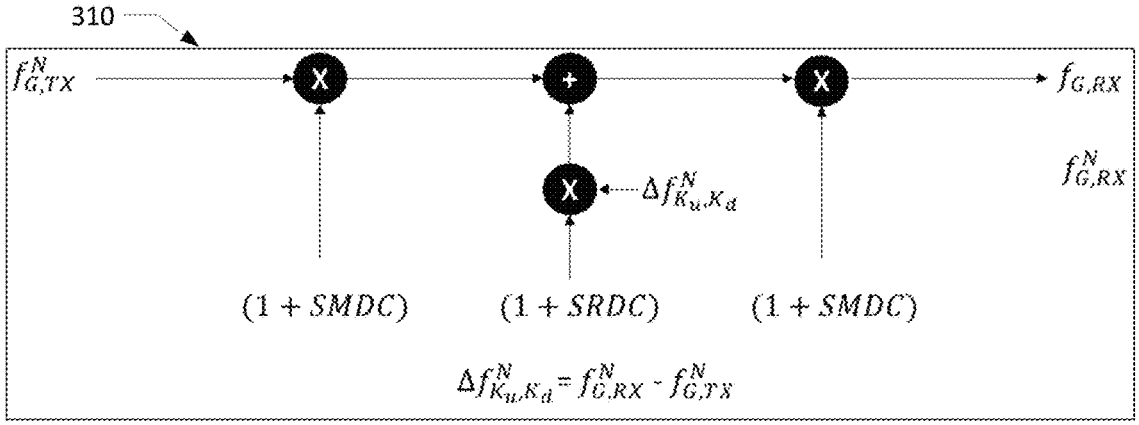
FIG. 3B illustrates a frequency error model of a loopback signal according to various embodiments.

FIG. 3B illustrates a frequency error model of a loopback signal according to various embodiments.

FIG. 3B illustrates a frequency error model 310 of a loopback signal $f_{G,TX}^N$. The loopback signal $f_{G,TX}^N$ may be transmitted by a GW, looped-backed through a satellite, and received by the GW with a frequency error. The frequency error includes an MRO error (1+SRDC), two-way satellite (uplink and downlink) motion induced Dopplers 2(1+SMDC) as the signal is a loopback and a frequency translation error $\Delta f_{K_u,K_d}^N$ by the satellite. The satellite introduces the frequency translation error $\Delta f_{K_u,K_d}^N$ (i.e., non-zero SRDC) in the uplink to downlink translation (for example, Ka-Ka frequency translation) due to the imperfect MRO. In some embodiments, the frequency translation error may be calculated as $\Delta f_{K_u,K_d}^N = f_{G,RX}^N - f_{G,TX}^N$.

Frequency Synchronization Framework

Figure 3C:
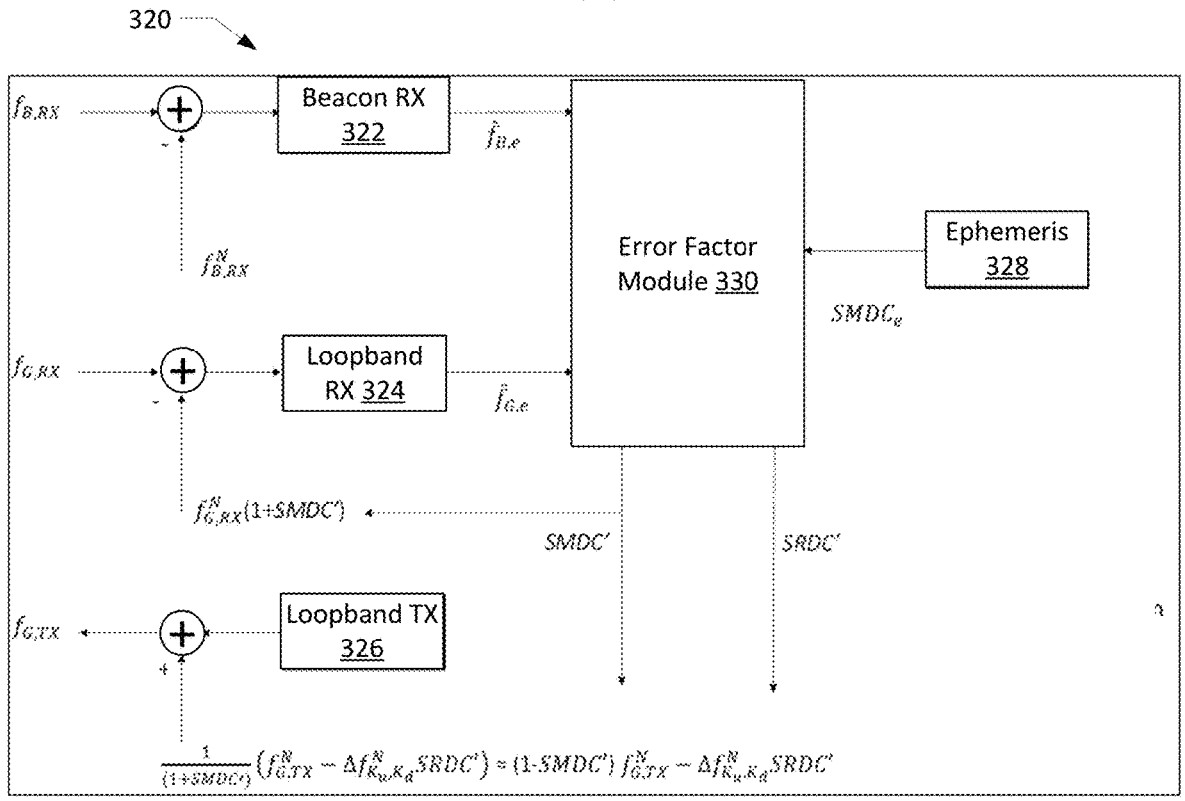
FIG. 3C illustrates a frequency error model to estimate a SMDC and a SRDC according to various embodiments.

FIG. 3C illustrates a frequency error model to estimate a SMDC and a SRDC according to various embodiments.

A frequency error model 320 may be used to estimate a SMDC and a SRDC for a beacon frequency and/or a loopback frequency. The frequency error factors SMDC and SRDC may be estimated based on the models of FIG. 3A and FIG. 3B along with ephemeris data and loopback signals. The beacon frequency and loopback frequency (are set at a nominal frequency without any Doppler pre-compensation.

The loopback frequency is transmitted from a RFT to a satellite with a carrier different then a carrier used to transmit the loopback frequency back to the RFT from the satellite. The frequency received at the beacon RX 322 may be represented as:

$$\hat{f}_{B,e} = (SRDC + SMDC + SRDC \cdot SMDC)f_{B,TX}^N \approx (SRDC + SMDC)f_{B,TX}^N \quad (1)$$

where $$f_{G,TX} = \frac{1}{(1+SMDC_e)}(f_{G,TX}^N - \Delta f_{K_u,K_d}^N SRDC_e) = \quad (2)$$

$$\frac{1}{(1+SMDC_e)}(f_{G,RX}^N - \Delta f_{K_u,K_d}^N (1+SRDC_e))$$

and where $\Delta f_{K_u,K_d}^N = f_{G,RX}^N - f_{G,TX}^N = -\Delta f_{K_u,K_d}^N$, $SMDC_e$ is from ephemeris data 328. $SRDC_e$ is computed using $\hat{f}_{B,e}$ in (1) and $SMDC_e$ is computed as $$SRDC_e = \frac{1}{(1+SMDC_e)}\left(\frac{\hat{f}_{B,e}}{f_{B,TX}^N} - SMDC_e\right) \approx \left(\frac{\hat{f}_{B,e}}{f_{B,TX}^N} - SMDC_e\right) \quad (3)$$

The frequency of the loopback RX 324 is set with the SMDC compensation, $(1+SMDC_e) f_{G,RX}^N$. The loopback receiver frequency offset estimate given by $$\hat{f}_{G,e} \approx \epsilon \quad (4)$$

to represent any error in Ephemeris based SMDC and the receiver estimation error. The error in (4) is mostly contributed by the imperfection in SMDC estimate as the receiver estimation error tends to be negligible after filtering. This error estimate from the loopback RX 324 can be used to update and refine SMDC and SRDC as follows:

$$SMDC' = SMDC_e + \frac{1}{2}\hat{f}_{G,e}/f_{G,TX}^N \quad (5)$$

$$SRDC' = \left(\frac{\hat{f}_{B,e}}{f_{B,TX}^N} - SMDC'\right)/(1+SMDC') \approx =  \quad (6)$$

$$\left(\frac{\hat{f}_{B,e}}{f_{B,TX}^N} - SMDC'\right) = SRDC_e - \frac{1}{2}\hat{f}_{G,e}/f_{G,TX}^N$$

The updated SMDC and SRDC may be used for pre and post compensating the loopback signal for TX and RX frequencies. Similarly, these SMDC and SRDC may be used for setting The derivation of (4) and the SMDC and SRDC updates may be performed in the following manner by an error factor module 330 implementing the frequency error model 320:

1. Ephemeris data 328 is used to determine a Satellite Motion Doppler Correction for Ephemeris ($SMDC_e$)
2. The beacon RX 322 calculates frequency offset ($\hat{f}_{B,e}$) based on a known beacon signal ($f_{B,TX}^N$)
3. Error factor module 330 computes a Satellite Reference Drift Correction for Ephemeris ($SRDC_e$) from $SMDC_e$ and $\hat{f}_{B,e}$ using (3)
4. Set frequency for loopback RX 324 according to $SRDC_e$ and $SMDC_e$ (included in SMDC' and SRDC' output by error factor module 330)
5. Set frequency for loopback TX 326 according to $SRDC_e$ and $SMDC_e$ (included in SMDC' and SRDC' output by error factor module 330)
6. Estimate the error from loopback receiver, $\hat{f}_{G,e}$
7. Update SRDC and SMDC using $SRDC_e$, $SMDC_e$ and $\hat{f}_{G,e}$.

$$SMDC'(n+1) = SMDC_e(n) + \frac{1}{2}\hat{f}_{G,e}(n)/f_{G,RX}^N \quad (8)$$

$$SRDC'(n+1) = \quad (9)$$

$$\left(\frac{\hat{f}_{B,e}(n)}{f_{B,TX}^N} - SMDC_e(n) - \frac{1}{2}\hat{f}_{G,e}(n)/f_{G,RX}^N\right) = \left(\frac{\hat{f}_{B,e}(n)}{f_{B,TX}^N} - SMDC'(n+1)\right)$$

The transmit and receive frequency may be adjusted using the updated SMDC' and SRDC' for the loopback transmitter and receiver as $$f_{G,TX}(n+1) = \frac{1}{(1+SMDC'(n+1))}(f_{G,TX}^N - \Delta f_{K_u,K_d}^N SRDC'(n+1)) \quad (10)\text{f}$$

$$f_{G,RX}(n+1) = (1+SMDC'(n+1))f_{G,RX}^N \quad (11)$$

8. Adjust the traffic channel RX and TX frequencies as $f_{T,RX}^N(1+SMDC')+\Delta f_{K_u,K_d}^N SRDC'$ and $$\frac{1}{(1+SMDC')}(f_{T,TX}^N - \Delta f_{K_u,L_d}^N SRDC') \approx$$

$$(1-SMDC')f_{T,TX}^N - \Delta f_{K_u,L_d}^N SRDC',$$

respectively.

From Equations (1) and (3), when ephemeris based SMDC has $e_{ep}$ error, then the derived SRDC in (3) has $e_{ep}$ error in the opposite sign. The transmit frequency in (2) with the errors can be represented as $$f_{G,TX} = \frac{f_{G,RX}^N}{(1+SMDC+e_{ep})} - \Delta f_{K_u,K_d}^N \frac{(1+SRDC-e_{ep})}{(1+SMDC+e_{ep})} \quad (12)$$

Then, the loopback receiver frequency offset estimation is represented as:

$$\hat{f}_{G,e} \approx -2e_{ep}f_{G,TX}^N \quad (13)$$

Based on (13) $e_{ep}$ may be determined as $$e_{ep} = -0.5(\hat{f}_{G,e}/f_{G,TX}^N) \quad (14)$$

Equations (5) and (6) are derived by correcting the error in SMDC and SRDC as $$SMDC' = SMDC_e - e_{ep} \quad (15)$$

$$SRDC' = \left(\frac{\hat{f}_{B,e}}{f_{B,TX}^N} - SMDC'\right) = SRDC_e + e_{ep} \quad (16)$$

With the loopback transmit frequency as shown in (12), the received frequency is $$f_{G,RX} = (f_{G,TX}(1+SMDC) + \Delta f_{K_u,K_d}^N(1+SRDC))(1+SMDC) = \quad (23)$$

$$(f_{G,RX}^N(1-e_{ep}) - \Delta f_{K_u,K_d}^N(1+SRDC-e_{ep})(1-e_{ep}) +$$

-continued $$\Delta f_{K_u,K_d}^N(1 + SRDC))(1 + SMDC) \approx$$
$$(f_{G,RX}^N(1 - e_{ep}) + 2e_{ep}\Delta f_{K_u,K_d}^N)(1 + SMDC)$$

With the SMDC compensation at the receiver, the loopback receiver estimates the frequency offsets as either (24) or (25)

$$\hat{f}_{G,e} = \left((f_{G,RX}^N(1 - e_{ep}) + 2e_{ep}\Delta f_{K_u,K_d}^N)\frac{(1 + SMDC)}{(1 + SMDC + e_{ep})} - f_{G,RX}^N\right) \approx \quad (24)$$
$$((f_{G,RX}^N(1 - e_{ep}) + 2e_{ep}\Delta f_{K_u,K_d}^N)(1 - e_{ep}) - f_{G,RX}^N \approx f_{G,RX}^N(1 - e_{ep}) +$$
$$2e_{ep}\Delta f_{K_u,K_d}^N - e_{ep}f_{G,RX}^N - f_{G,RX}^N = 2e_{ep}\Delta f_{K_u,K_d}^N - 2e_{ep}f_{G,RX} =$$
$$2e_{ep}(\Delta f_{K_u,K_d}^N - f_{G,RX}^N) = 2e_{ep}(f_{G,RX}^N - f_{G,TX}^N - f_{G,RX}^N) = -2e_{ep}f_{G,TX}^N$$

$$\hat{f}_{G,e} = \quad (25)$$
$$(f_{G,RX}^N(1 - e_{ep} + SMDC) + 2e_{ep}\Delta f_{K_u,K_d}^N) - (1 + SMDC + e_{ep})f_{G,RX}^N =$$
$$-2e_{ep}f_{G,RX} + 2e_{ep}\Delta f_{K_u,K_d}^N \approx -2e_{ep}f_{G,TX}^N$$

From (24) or (25), $\hat{f}_{G,e} \approx -2e_{ep}f_{G,TX}^N$ may be obtained as shown in (13). In (24) the received signal is SMDC compensated before the baseband conversion; and in (25) the received signal is down converted with the SMDC adjusted nominal RX frequency. As expected, both approaches yield the same result. Approximations used in (23), (24), (25):

$$\frac{1}{(1 + SMDC + e_{ep})}(1 + SMDC) \approx \quad (26)$$
$$(1 - SMDC - e_{ep}) \cdot (1 + SMDC) \approx 1 - e_{ep}$$

$$\frac{(1 + SRDC - e_{ep})}{(1 + SMDC + e_{ep})} \approx \quad (27)$$
$$(1 + SRDC - e_{ep})(1 - SMDC - e_{ep}) \approx 1 + SRDC - SMDC - 2e_{ep}$$

Timing Synchronization

In the absence of a satellite generated timing reference signal (e.g., PSS in the prior art), the present teachings use a GNSS derived timing as the absolute timing reference (or system time). The timing synchronization reference point may be defined at the satellite. The GW adjusts transmit timing so that the received signals are aligned with the frame boundary referenced at the satellite. For an accurate timing synchronization, the GW utilizes both the Ephemeris data as well as the timing measurement from the loopback signals.

Figure 4:
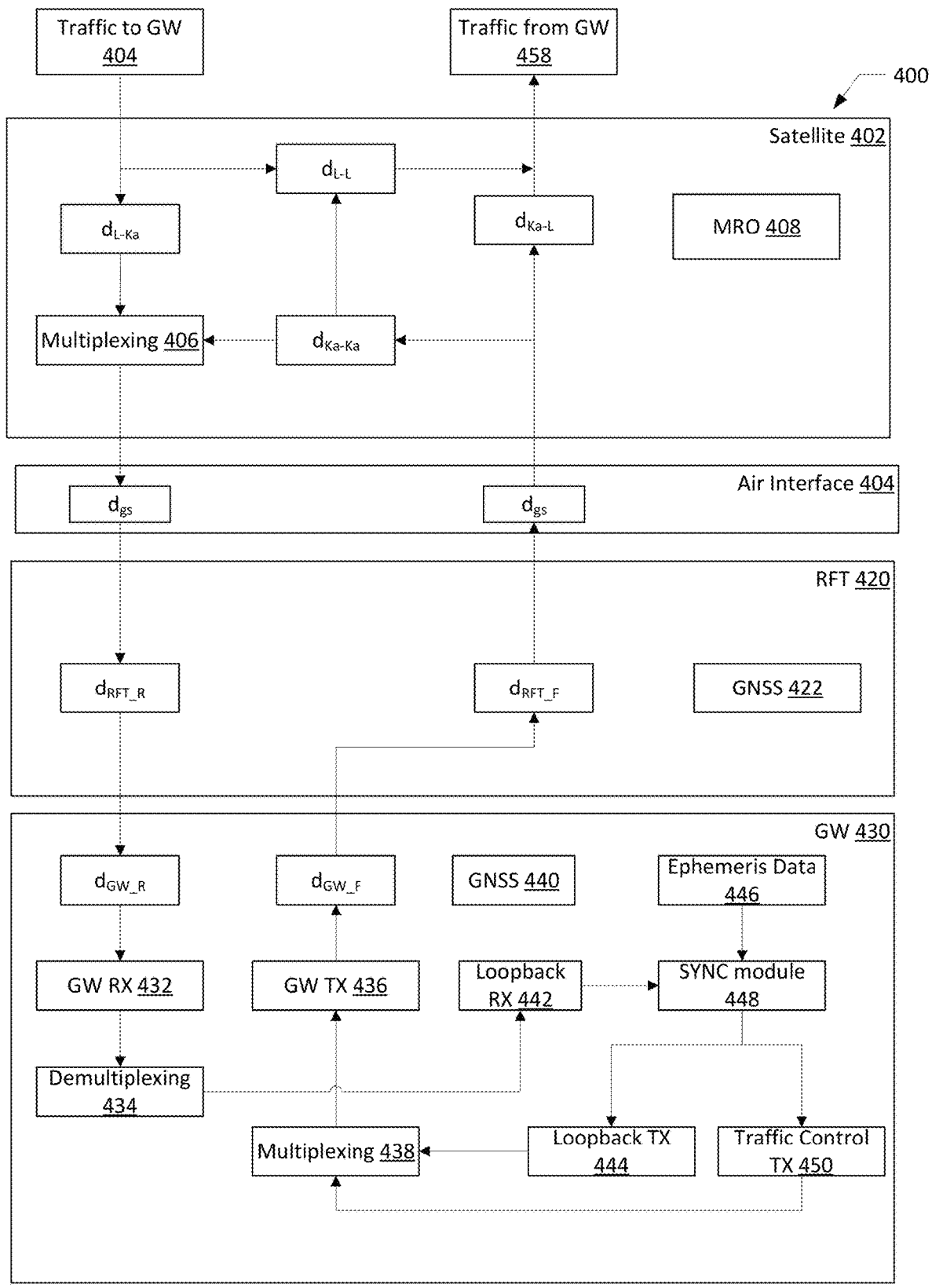
FIG. 4 illustrates a satellite system including a timing synchronization framework according to various embodiments.

FIG. 4 illustrates a satellite system including a timing synchronization framework according to various embodiments.

A timing synchronization framework 400 may be implemented across a satellite 402, an air interface 404, an RFT 420 and a GW 430. A forward path refers to a path from the satellite 402 to the GW 430. A return path refers to a path from the GW 430 to the satellite 402. The timing synchronization framework 400 may determine receive and transmission timing and/or frame numbering according to various embodiments. Frame timing or simply timing can slowly drift from an absolute timing reference due to delay variations caused by satellite movement. The timing can slowly drift from the absolute timing reference due to delay variations caused by temperature variation, aging and the like among hardware components.

The timing reference is defined at the satellite 402 for a RFT 420 and a GW 430. Signals travel from the satellite 402 to GW 430 via an air interface 404 and the RFT 420. The satellite 402, the air interface 404, the RFT 420 and the GW 430 may cause delays and can have delay variations. Different frequency signals may use different components or signal paths within the satellite 402 and the RFT 420. For example, there may be a delay ($d_{L-L}$) in a L-band path, a delay ($d_{Ka-L}$) in Ka to L band path, and a delay ($d_{Ka-Ka}$) in a Ka-band path. Each of these delays may be different. In some embodiments, a timing reference may be defined for each path used in the satellite system. In the L-band, the reference may be defined at the L-band downlink antenna (i.e., all the L-band downlink signals, including T-T single hop calls, are frame aligned at the L-band antenna output). In the Ka-band, the reference may be defined at the Ka-band downlink antenna (i.e., all the Ka-band downlink signals, including loopback, are frame boundary aligned at the Ka-band antenna output). In some embodiments, the delays among difference paths are the same, for example, $d_{L-Ka}=d_{L-L}+d_{Ka-Ka}+d_{Ka-L}$, and the timing references at L-band and Ka-band coincide.

The satellite 402 may include a MRO 408 to provide the necessary reference clock signals and a multiplexor 406 to combine a traffic to GW 430 with other signals, such as, a beacon signal, a loopback signal and the like. The combined signal from the multiplexor 406 may be transmitted via the air interface 404 and the RFT 420 to the GW 430. In reverse, the satellite 402 may receive return traffic 458 via the air interface 404 and the RFT 420 from the GW 430.

The RFT 420 may induce a delay $d_{RFT\_R}$ on a return path and a delay $d_{RFT\_F}$ on a forward path. The RFT 420 is responsible for transmitting and receiving signals from the satellite 402. The RFT 420 may include a GNSS 422 receiver to provide a reference clock to synchronize with the MRO 408.

The GW 430 may include a GW receiver 432, a demultiplexor 434, a GW transmitter 436, a multiplexor 438, a GNSS receiver 440, a loopback RX 442, a loopback TX 444, an ephemeris data module 446, a sync module 448, and a traffic control TX 450.

The loopback TX 444 may transmit a loopback signal to the satellite 402 via the return path. The loopback RX 442 may receive the loopback signal from the satellite 402 via the forward path. The demultiplexor 434 may separate and route the loopback signal, the beacon signal, the forward traffic appropriately. The multiplexor 438 may combine the loopback signal and the return traffic.

In some embodiments, the GNSS receiver 440 may be a GNS receiver that provides 10 MHz timing and frequency reference clock. The GNSS receiver 440 may provide a GNSS-aligned system timecode as a signal. The GNSS-aligned system timecode may a reference for timing needs of the timing synchronization framework 400.

The sync module 448 provides feeder link time and frequency synchronization. The sync module 448 may generate a Common Frame Reference (CFR) and a frame number from the GNSS-aligned system timecode.

In exemplary embodiments, a nominal transmit and receive timing may be initially derived from interpolated ephemeris data and known component delays (expected or measured). Subsequent loopback transmission and receive timing may be tracked and adjusted based on timing estimation measurement results. In exemplary embodiments, the Common Frame Reference (CFR) 472 may be based on a GNSS (for example, GPS) time to provide a GNSS-aligned timecode. A satellite to gateway delay ($d_{GS}$) maybe computed using loopback transmission and receive measured or estimated time. The $d_{GS}$ values may be interpolated, for example, with the linear least square method. In some embodiments, a satellite to ground delay $d_{SG}$ value may be set to the $d_{GS}$ value. Tn and Rn generation may be based on $d_{GS}$ to determine transmit and receive frame delays. In some embodiments, no timing compensation/adjustment may be performed for a CW beacon signal reception, for example, by avoiding any distortion on CW beacon signal. In some embodiments, a system frame number may be generated from the GNSS-aligned timecode. A gateway transmit and receive frame numbers may be derived from a system frame number based on the $d_{GS}$ based one a Round-Trip Time from the satellite 462 to the GW 464 divided by a count of CFR clock ticks rounded up (M frames) needed for the transit. In some embodiments, for a geosynchronous satellite, the M may be equal to 5 or 6.

Timing Synchronization Framework

In order for the GW transmit frame boundary to be received at the satellite L-band downlink antenna output reference, the GW may adjust its transmit timing as follows:

$$T_{traffic,Control\_F} = T_{L\text{-band downlink ref}} - (d_{GW\_F} + d_{RFT\_F} + d_{gs} + d_{Ka-L}) \quad (17)$$

Similarly, the GW may adjust its receive timing as follows so that the downlink signal frame boundary is aligned at the satellite Ka-band downlink antenna:

$$T_{traffic,Control\_R} = T_{Ka\text{-band downlink ref}} + d_{gs} + d_{RFT\_R} + d_{GW\_R} \quad (18)$$

The equations (17) and (18) require the knowledge of $d_{gs}$ and equipment delays ($d_{GW\_F}$, $d_{RFT\_F}$, $d_{Ka-L}$, $d_{GW\_R}$, $d_{RFT\_R}$). The nominal equipment delays may be measured prior to the satellite launch and any drift from temperature variation and aging may be tracked by the measuring loopback TX and RX time. The delay between the satellite and the GW, $d_{gs}$, may be tracked by using Ephemeris as well as by the direct measurement of time difference between the loopback TX and RX time, or as provided in (19).

$$\Delta_{GFR} = GFR_{RX_{time}} - GFR_{TX_{time}} = 2d_{gs} + d_{RFT\_F} + d_{GW\_F} + d_{Ka-Ka} + d_{RFT\_R} + d_{GW\_R} \quad (19)$$

Given (19), the delay between the satellite and the GW, $d_{gs}$, may be given by $$d_{gs} = \frac{1}{2}\left[\Delta_{GFR} - (d_{RFT_F} + d_{GW_F} + d_{Ka-Ka} + d_{RFT_R} + d_{GW_R})\right] \quad (20)$$

The loopback nominal transmit and receive timing may be initially derived from the ephemeris data and known equipment component delay measurement values. Subsequent loopback transmission and receive timing may be tracked and adjusted based on loopback transmit and receive timing measurement results.

Frame Number Synchronization

A frame number (FN) may be based on an absolute system timing (for example, GPS time). In some embodiments, the frame duration may be 40 ms, and the frame numbering may be cycled in a hyperframe duration $T_{HYP}$. In some embodiments, the hyperframe duration $T_{HYP}$ may be set to 3 h 28 min 53 s 760 ms, or 313 344 TDMA frames. If the absolute system timing relative to the start of the system operation is denoted as T in ms, then FN can be given as a function of time T:

$$FN = \text{floor}\left[\frac{T \bmod T_{HYP}}{40}\right] \quad (3\text{-}21)$$

If a traffic burst wraps across the boundary between two frames, a frame number applied to the burst may be the number of the first frame, in other words, the one with smaller number. When the timing reference is defined at the satellite, the GW may compute the FN with the adjustment for $d_{gs}$ and equipment delays for each direction.

Ephemeris Data Processing

An Ephemeris data file may contain state vectors corresponding to the future time epochs with a coarse granularity. The TCB may generate the $d_{GS}$ and $SMDC_e$ samples at a finer granularity, for example, 1 second. The $d_{GS}$ and $SMDC_e$ samples may be interpolated at a granularity of 0.5 seconds using a first order linear Lagrange interpolation. The interpolated $d_{GS}$ and $SMDC_e$ sample values may be used as an input for frequency and timing synchronization.

Frequency Synchronization

The GW may achieve feeder link frequency synchronization using the Ephemeris data, and frequency offset measurements from the beacon and loopback signals. A GNSS receiver at the gateway may supply a reference clock. A satellite may transmit multiple beacon signals (primary and redundancy) with a separation. Multiple beacon receivers are may acquire the beacon signals and compute a frequency offset due to any MRO error in the satellite (SRDC) and satellite motion induced Doppler (SMDC). The beacon frequency offset may be used as the input along with SMDC estimation derived from Ephemeris to compute the SMDC and SRDC.

The gateway may transmit loopback signals to the satellite in an uplink and subsequently receive the loopback signals in a downlink to estimate the frequency offset. The frequency offset may be used to compute the SMDC and SRDC. Each GW transmits and receives its own loopback signal using one of the designated frequencies. The loopback TX and RX frequency on each ERFN may be unique.

Feeder Link Doppler Compensation

The beacon RX frequency is set at the nominal frequency without any Doppler pre-compensation. The pre and post Doppler compensation are performed on loopback transmitter and receiver as well as control/traffic channel transmitter and receiver. The CDM performs SMDC and SRDC estimation based on Equations (8) and (9). The estimated SMDC and SRDC are used to compensate loopback transmit and receive frequency as well as control and traffic channel transmit and receive frequency. The Doppler compensated loopback TX and RX frequencies, $f_{G,TX}$ and $f_{G,RX}$, may be computed based on Equations (10) and (11). A control and traffic channel transmitter and receiver may compute the Doppler compensated burst TX and RX frequencies, $f_{T,TX}$ and $f_{T,RX}$, using the estimated SMDC and SRDC results as outlined above.

Beacon Receiver Redundancy Handling

The multiple beacon receivers run independently. Each beacon receiver generates its own frequency offset estimation. An output of an active or primary beacon receiver may be used for frequency synchronization. The output of passive or secondary beacon receivers is not used when the active beacon receiver is running. When the active receiver reports outage and stays in outage state for more than a configurable time duration, a CDM checks the state of the passive receiver.

When all beacon receivers are in outage state, the CDM may use the most recent output of the active receiver and raise an alarm. When the active receiver is in outage state but the passive receiver is not, the CDM changes the passive receiver to active and uses the output from the newly active receiver. The CDM may start the new passive receiver in the acquisition mode.

System Timing Reference and Frame Number Generation

In some embodiments, the present teachings use a GPS derived timing as the system timing reference. The GPS receiver at the gateway supplies a 10 MHz timing reference clock and the GPS-aligned IRIG timecode signal to all ERFN modules. The 10 MHz clock and IRIG timecode may be used to derive the gateway time and frequency references. The CDM derives the number of seconds elapsed since a GPS initialization time from the IRIG timecode. The CDM uses the 10 MHz reference timing clock to generate subsecond GPS reference markers. At each second, the subsecond time-marker is aligned to the 1-second GPS-aligned IRIG timing marker.

Let the integer number representing the number of seconds elapsed since the GPS initialization time be $N_{sec}$, the number of subsecond GPS reference markers elapsed at the CDM since the last GPS second-marker be $N_{subsec}$, and the time periods of the $N_{subsec}$ marker be $T_{subsec}$ in unit of second. Then the number of 40 msec time intervals elapsed since the GPS initialization time ($N_{40\ ms}$) is $$N_{40ms} = \text{floor}\left[\frac{N_{sec} + T_{subsec} \times N_{subsec}}{40 \times 10^{-3}}\right].$$

As $N_{40\ ms}$ is derived from the IRIG 1-second marker (1-second time-tick and the subsecond GPS time-marker), it corresponds to a unique GPS time-tick (either 1-second or the subsecond), which marks the start of a 40 msec GPS-aligned TDMA frame. Let us denote the time-instant corresponding to $N_{40\ ms}$ as $T_{GPS-REF}$. $T_{GPS-REF}$ is not an isolated timing instant; it is a periodic timing marker aligned to the start of the GPS 40 msec frames with a repetition period of 40 msec.

The GPS-aligned frame number is obtained from $N_{40\ ms}$ as the integer remainder after dividing $N_{40\ ms}$ by 313,344. Thus, $FN = N_{40\ ms}$ mod 313344.

Gateway to Satellite Delay ($D_{GS}$) Computation

Figure 4A:
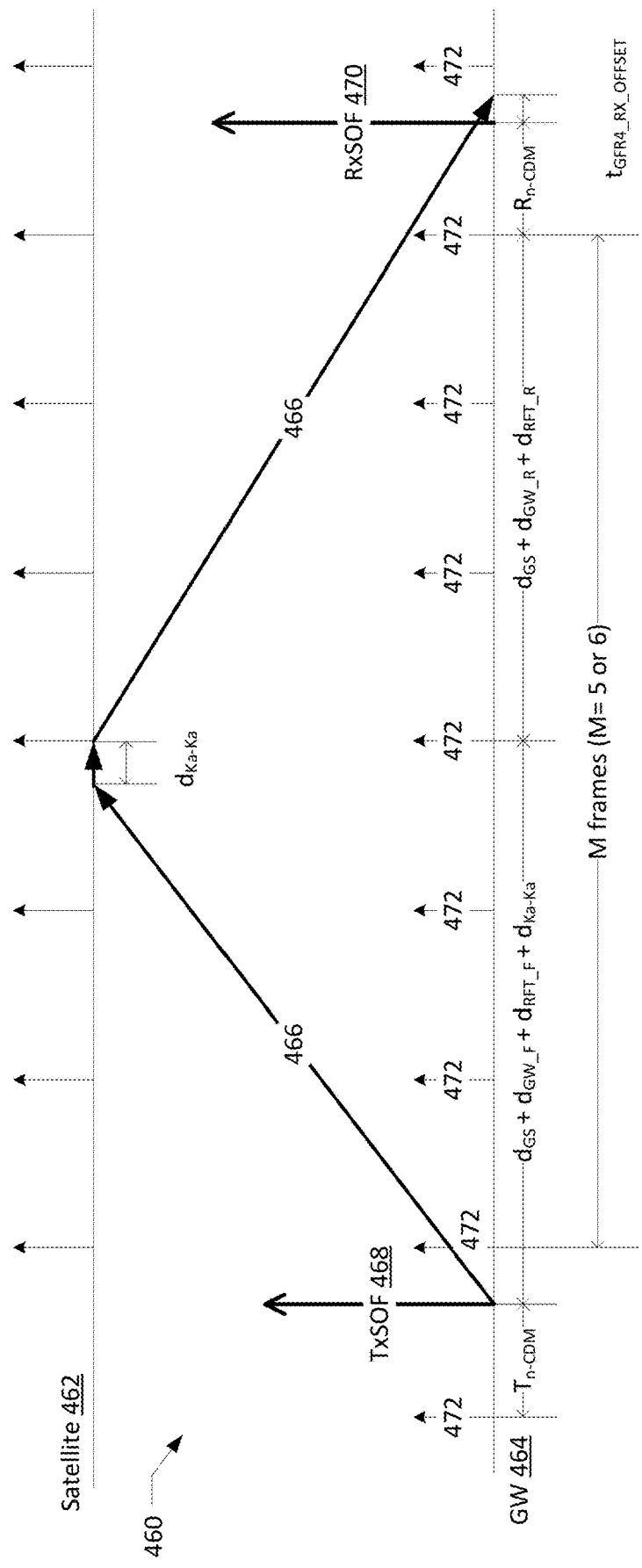
FIG. 4A illustrates loopback timing for a loopback signal, according to various embodiments.

FIG. 4A illustrates loopback timing for a loopback signal, according to various embodiments.

FIG. 4A illustrates a timing synchronization framework 460 for a loopback signal 466 between a satellite 462 and a GW 464. The GW 464 transmits the loopback signal 466 to the satellite 462 to compute the round-trip delay through the satellite 462 and to compute the $d_{GS}$ plus the transmit and receive offset with respect to a frame reference or CFR. The loopback signal 466 may be looped back via the Ka-Ka-band transponder at the satellite to the CDM. When frames are used, a transmit start of frame (TxSoF 468) and a receive start of frame (RxSOF 470) for the loopback signal are illustrated.

The CDM determines the loopback signal transmit timing ($T_{GFR4\_TX}$) based on the reference timing $T_{GPS\_REF}$ and $T_{n\_CDM}$. $T_{n\_CDM}$ represents the delay from the timing reference point to the loopback signal transmit timing ($T_{GFR4\_TX}$) is:

$$T_{GFR4\_TX} = T_{GPS\_REF} + T_{n\_CDM}.$$

where $T_{n\_CDM}$ may be set as $T_{n\_CDM} = 40$ ms $- ((d_{GS} + d_{Ka\text{-}Ka} + d_{GW\_F} + d_{RFT\_F})$ % 40 ms), $d_{GS}$ is calculated using (22), $d_{Ka\text{-}Ka}$ is the satellite's Ka-Ka loopback path delay, $d_{GW\_F}$ is the delay within the GW in the forward path, and $d_{RFT\_F}$ is the delay within the RFT in the forward path.

The CDM determines the loopback signal receive timing ($T_{GFR4\_RX}$) using the reference timing reference $T_{GPS\_REF}$ and $R_{n\_CDM}$. $R_{n\_CDM}$ represents the delay from the timing reference point to the loopback signal receive timing ($T_{GFR4\_RX}$) and is calculated as $$T_{GFR4\_RX} = T_{GPS\_REF} + R_{n\_CDM}$$

where $R_{n\_CDM} = (d_{GS} + d_{GW\_R} + d_{RFT\_R})$ % 40 ms, $d_{GS}$ is calculated using (22), $d_{GW\_R}$ is the hardware delay within the GW in the return path, and $d_{RFT\_R}$ is the hardware delay within the RFT in the return path.

The loopback receiver generates the loopback receive time offset $t_{GFR4_RX_OFFSET}$. From the round-trip delay between the loopback transmission and the reception, the gateway to satellite delay $d_{GS}$ may be calculated as:

$$d_{GS} = 0.5 \times [(\text{loopback signal receive time} - \text{loopback signal transmit time}) - (d_{Ka\text{-}Ka} + (d_{GW\_F} + d_{RFT\_F}) + (d_{GW\_R} + d_{RFT\_R}))] \quad (22)$$

Failure Scenarios

When the Ephemeris is not available or failed to download, a critical alarm may notify the operator of this error and the most recent Ephemeris may be used to compute the $d_{GS}$ value. When a loopback receiver reports an outage, interpolated $d_{GS}$ samples based on the current time stamp may be used to compute the $T_{n\_GTS}$ and $R_{n\_GTS}$ until the loopback receiver leaves the outage condition. When one on the beacons is not available, the system uses one of remaining available ones. When all beacons are down, the timing sync operates as normal and the frequency sync may operate using the most recent frequency estimate. The various scenarios and modes of operations are detailed in the following table.

| Beacon 1 | Beacon 2 | Loopback | Ephemeris | Procedure |
|---|---|---|---|---|
| Yes | Yes | Yes | Yes | Timing Sync: Normal<br>Freq. Sync: Normal |
| No | Yes | Yes | Yes | Timing Sync: Normal<br>Freq. Sync: Normal |
| Yes | No | Yes | Yes | Timing Sync: Normal<br>Freq. Sync: Normal |
| Yes | Yes | No | Yes | Timing Sync: loopback freeze mode.<br>Freq. Sync: Freeze mode. Use the most recent loopback frequency estimate to compute SMDC and SRDC.<br>(Raise alarm. System e considered down.) |
| No | Yes | No | Yes | Timing Sync: loopback freeze mode.<br>Freq. Sync: Freeze mode. Use the most recent loopback frequency estimate to compute SMDC and SRDC.<br>(Raise alarm. System e considered down.) |
| Yes | No | No | Yes | Timing Sync: loopback freeze mode.<br>Freq. Sync: Freeze mode. Use the most recent loopback frequency estimate to compute SMDC and SRDC.<br>(Raise alarm. System e considered down.) |
| No | No | No | Yes | Timing Sync: loopback freeze mode.<br>Freq. Sync: Freeze mode. Use the most recent loopback frequency estimate to compute SMDC and SRDC.<br>(Raise alarm. System e considered down.) |

-continued

| Beacon 1 | Beacon 2 | Loop-back | Ephem-eris | Procedure |
|---|---|---|---|---|
| No | No | Yes | Yes | Timing Sync: Normal Freq. Sync: Freeze mode. Use the most recent beacon frequency estimate to compute SRDC. (Raise alarm to EMS. System can be considered down due to lack of beacon.) |
| Yes | Yes | Yes | No | Timing Sync: Ephemeris freeze mode Freq. Sync: Freeze mode. Use the most recent SMDC Ephemeris data to compute SMDC and SRDC. (Raise alarm. System considered down for lack of Ephemeris.) |
| No | Yes | Yes | No | Timing Sync: Ephemeris freeze mode Freq. Sync: Freeze mode. Use the most recent SMDC Ephemeris data to compute SMDC and SRDC. (Raise alarm. System considered down for lack of Ephemeris.) |
| Yes | No | Yes | No | Timing Sync: Ephemeris freeze mode Freq. Sync: Freeze mode. Use the most recent SMDC Ephemeris data to compute SMDC and SRDC. (Raise alarm. System considered down for lack of Ephemeris.) |
| No | No | Yes | No | Timing Sync: Ephemeris freeze mode Freq. Sync: Freeze mode. Use the most recent SMDC Ephemeris data to compute SMDC and SRDC. (Raise alarm. System considered down for lack of Ephemeris.) |
| Yes | Yes | No | No | Timing Sync: Ephemeris freeze mode and loopback freeze mode Freq. Sync: Freeze mode. Use the most recent SMDC Ephemeris data and loopback frequency estimate to compute SMDC and SRDC. (Raise alarm. System considered down.) |
| No | Yes | No | No | Timing Sync: Ephemeris freeze mode and loopback freeze mode Freq. Sync: Freeze mode. Use the most recent SMDC Ephemeris data and loopback frequency estimate to compute SMDC and SRDC. (Raise alarm. System considered down.) |
| Yes | No | No | No | Timing Sync: Ephemeris freeze mode and loopback freeze mode Freq. Sync: Freeze mode. Use the most recent SMDC Ephemeris data and loopback frequency estimate to compute SMDC and SRDC. (Raise alarm. System considered down.) |
| No | No | No | No | Timing Sync: Ephemeris freeze mode and loopback freeze mode Freq. Sync: Freeze mode. Use the most recent SMDC Ephemeris data and loopback frequency estimate to compute SMDC and SRDC. (Raise alarm. System considered down.) |

Frame Number Synchronization

Frame number synchronization ensures that the frames received at the satellite from the gateway and the UT (i.e., on the forward and the return links) are synchronized with the GPS-derived Frame Number (FN). The gateway may determine the frame numbers of the transmit and received TDMA frames as:

Frame Number of the transmitted frame =

$$FN + \text{floor}\left[\frac{d_{GS} + d_{Ka-L} + d_{GW\_F} + d_{RFT\_F}}{40 \times 10^{-3}}\right], \text{ and}$$

Frame Number of the received frame =

$$FN - \text{ceiling}\left[\frac{d_{GS} + d_{GW\_R} + d_{RFT\_R}}{40 \times 10^{-3}}\right]$$

where the delays $d_{GS}$, $d_{Ka-L}$, $d_{GW\_F}$, $d_{RFT\_F}$ $d_{GW\_R}$, and $d_{RFT\_R}$ are in seconds and FN denotes the GPS-derived frame number at the gateway at the time of transmission or the reception of the actual TDMA frame.

Loopback Transmission Power Control

Figure 5:
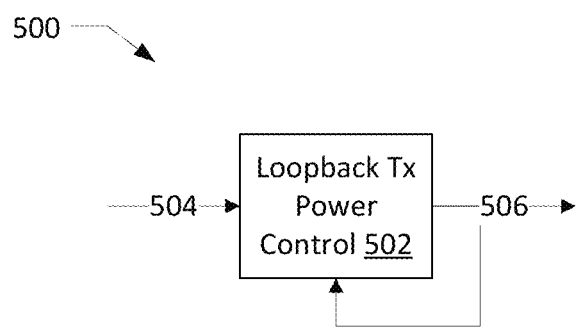
FIG. 5 illustrates a method for adjusting a transmit power of a loopback signal based on an SNR measurement of a received loopback signal.

FIG. 5 illustrates a method for adjusting a transmit power of a loopback signal based on an SNR measurement of a received loopback signal.

The present teachings include a method 500 for adjusting a transmit power of a loopback signal based on an SNR measurement of a received loopback signal. The transmit power of loopback bursts may be adjusted dynamically to achieve an optimum quality of loopback received signal and efficient utilization of a loopback transmit power. Without robust power control, the loopback receiver may not be able to demodulate the received bursts as the received burst SNR is too low. Conversely, efficient power control can save satellite power by transmitting at an effective isotropic radiated power (EIRP) level sufficient to combat the actual level of fading being experienced on a feeder link, rather than at a constant EIRP level corresponding to the requirements of the worst-case link.

A transmit power for the loopback transmitter may be set by a first order filter 502 as a difference between a current RX loopback signal SNR 504 and a desired/nominal SNR for the received loopback signal. This may be computed as:

$$GFR\_Tx\_Power\_Backoff_{next} = K_1 * \Delta_{SNR} + K_2 * GFR\_Tx\_Power\_Backoff_{current}$$

where $\Delta_{SNR}$ is the difference 506 between a nominal SNR (operator configured) and the current RX loopback signal SNR 504. $K_1$ is a power control coefficient, and $K_2$ is a power control time constant.

The above two equations align the transmit and the receive frame numbers to the GPS frame number FN at the satellite. In some embodiments, the gateway transmitter advances the frame numbering of the forward link frames at the gateway with respect to the GPS frame numbering at the satellite. Similarly, the gateway return link frame numbering is delayed with respect to the GPS frame numbering at the satellite.

Method for Frequency and Time Synchronization

Figure 6:
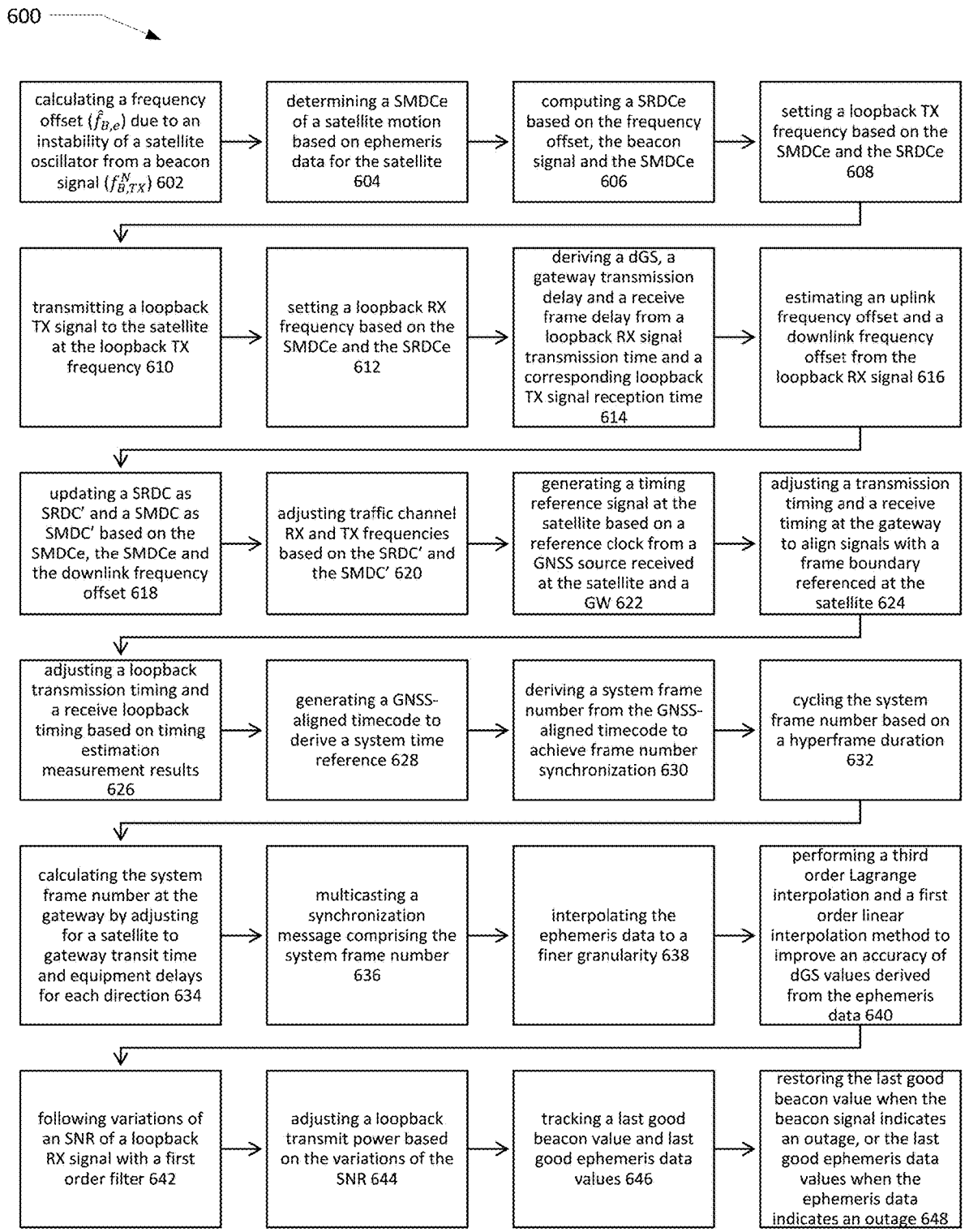
FIG. 6 is a flowchart of an example method for frequency and time synchronization with respect to a satellite, according to various embodiments.

FIG. 6 is a flowchart of an example method for frequency and time synchronization with respect to a satellite, according to various embodiments.

In FIG. 6, a method 600 for frequency and time synchronization with respect to a satellite includes one or more of the following operations.

At operation 602, the method 600 includes calculating a frequency offset ($\hat{f}_{B,e}$) due to an instability of a satellite oscillator from a beacon signal ($f_{B,TX}^N$). At operation 604, the method 600 includes determining a $SMDC_e$ of a satellite motion based on ephemeris data for the satellite. At operation 606, the method 600 includes computing a $SRDC_e$ based on the frequency offset, the beacon signal and the $SMDC_e$. At operation 608, the method 600 includes setting a loopback TX frequency based on the $SMDC_e$ and the $SRDC_e$. At operation 610, the method 600 includes transmitting a loopback TX signal to the satellite at the loopback TX frequency.

At operation 612, the method 600 includes setting a loopback RX frequency based on the $SMDC_e$ and the $SRDC_e$.

At operation 614, the method 600 includes deriving a $d_{GS}$, a gateway transmission delay and a receive frame delay from a loopback RX signal transmission time and a corresponding loopback TX signal reception time.

At operation 616, the method 600 includes estimating an uplink frequency offset and a downlink frequency offset from the loopback RX signal.

At operation 618, the method 600 includes updating a SRDC as SRDC' and a SMDC as SMDC' based on the $SMDC_e$, the $SMDC_e$ and the downlink frequency offset. At operation 620, the method 600 includes adjusting traffic channel RX and TX frequencies based on the SRDC' and the SMDC'. At operation 622, the method 600 includes generating a timing reference signal at the satellite based on a reference clock from a GNSS source received at a GW. At operation 624, the method 600 includes adjusting a transmission timing and a receive timing at the gateway to align signals with a frame boundary referenced at the satellite. At operation 626, the method 600 includes adjusting a loopback transmission timing and a receive loopback timing based on timing estimation measurement results.

At operation 628, the method 600 includes generating a GNSS-aligned timecode to derive a system time reference. At operation 630, the method 600 includes deriving a system frame number from the GNSS-aligned timecode to achieve frame number synchronization. At operation 632, the method 600 includes cycling the system frame number based on a hyperframe duration. At operation 634, the method 600 includes calculating the system frame number at the gateway by adjusting for a satellite to gateway transit time and equipment delays for each direction. At operation 636, the method 600 includes multicasting a synchronization message comprising the system frame number.

At operation 638, the method 600 includes interpolating the ephemeris data to a finer granularity. At operation 640, the method 600 includes performing a third order Lagrange interpolation and a first order linear interpolation method to improve an accuracy of dGS values derived from the ephemeris data.

At operation 642, the method 600 includes following variations of an SNR of a loopback RX signal with a first order filter. At operation 644, the method 600 includes adjusting a loopback transmit power based on the variations of the SNR.

At operation 646, the method 600 includes tracking a last good beacon value and last good ephemeris data values. At operation 648, the method 600 includes restoring the last good beacon value when the beacon signal indicates an outage, or the last good ephemeris data values when the ephemeris data indicates an outage.

ACRONYM LIST

| Acronym | Description |
| --- | --- |
| CDM | Clock Distribution Module |
| CFR | Common Frame Reference |
| CW | Continuous Waveform |
| DSM | Digital Signal processing Module |
| FN | Frame Number |
| FS | Frequency Slot |
| GFR | Gateway Frame Reference/loopback signal |
| GPS | Global Positioning System |
| GNSS | Global Navigation Satellite System |
| GW | Gateway |
| IRIG | Inter-Range Instrumentation Group |
| MRO | Master Reference Oscillator |
| PSS | Processor Synchronization Signal |
| RF | Radio Frequency |
| RFT | Radio Frequency Terminal |
| RX | Receive |
| SMDC | Satellite Motion Doppler Correction |
| SNR | Signal-to-Noise Ratio |
| SRDC | Satellite Reference Drift Correction |
| TDMA | Time Division Multiple Access |
| TX | Transmit |
| ULPC | Up Link Power Control |
| UT | User Terminal |

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for frequency and time synchronization with respect to a satellite, the method comprising:
    calculating a frequency offset ($\hat{f}_{B,e}$) due to an instability of a satellite oscillator from a beacon signal ($f_{B,TX}^N$);
    determining a Satellite Motion Doppler Correction for Ephemeris ($SMDC_e$) of a satellite motion based on ephemeris data for the satellite;
    computing a Satellite Reference Drift Correction for Ephemeris ($SRDC_e$) based on the frequency offset, the beacon signal and the $SMDC_e$;
    setting a loopback TX frequency based on the $SMDC_e$ and the $SRDC_e$; and
    transmitting a loopback TX signal to the satellite at the loopback TX frequency.

2. The method of claim 1, wherein the beacon signal comprises an unmodulated CW signal.

3. The method of claim 1, wherein the setting further comprises setting a loopback RX frequency based on the $SMDC_e$ and the $SRDC_e$.

4. The method of claim 1, further comprising deriving a satellite to gateway delay ($d_{GS}$), a gateway transmission delay and a receive frame delay from a loopback RX signal transmission time and a corresponding loopback TX signal reception time.

5. The method of claim 1, further comprising receiving a loopback RX signal based on the loopback TX signal; and estimating an uplink frequency offset and a downlink frequency offset from the loopback RX signal.

6. The method of claim 5, further comprising updating a Satellite Reference Drift Correction (SRDC) as SRDC' and a Satellite Motion Doppler Correction (SMDC) as SMDC' based on the $SMDC_e$, the $SMDC_e$ and the downlink frequency offset.

7. The method of claim 6, further comprising adjusting traffic channel RX and TX frequencies based on the SRDC' and the SMDC'.

8. The method of claim 1, further comprising:
generating a timing reference signal at the satellite based on a reference clock from a Global Navigation Satellite System (GNSS) source at a Gateway (GW); and
adjusting a transmission timing and a receive timing at the gateway to align signals with a frame boundary referenced at the satellite.

9. The method of claim 8, wherein the adjusting further comprises adjusting a loopback transmission timing and a receive loopback timing based on timing estimation measurement results.

10. The method of claim 8, further comprising generating a GNSS-aligned timecode to derive a system time reference.

11. The method of claim 10, further comprising deriving a system frame number from the GNSS-aligned timecode to achieve frame number synchronization.

12. The method of claim 11, further comprising cycling the system frame number based on a hyperframe duration.

13. The method of claim 11, further comprising calculating the system frame number at the gateway by adjusting for a satellite to gateway transit time and equipment delays for each direction.

14. The method of claim 11, further comprising multicasting a synchronization message comprising the system frame number.

15. The method of claim 1, further comprising interpolating the ephemeris data to a finer granularity.

16. The method of claim 15, wherein the interpolating comprises performing a third order Lagrange interpolation and a first order linear interpolation method to improve an accuracy of $d_{GS}$ values derived from the ephemeris data.

17. The method of claim 1, further comprising following variations of an SNR of a loopback RX signal with a first order filter; and adjusting a loopback transmit power based on the variations of the SNR.

18. The method of claim 1, further comprising tracking a last good beacon value and last good ephemeris data values; and restoring the last good beacon value when the beacon signal indicates an outage, or the last good ephemeris data values when the ephemeris data indicates an outage.

19. The method of claim 17, wherein the tracking further comprises tracking a last good loopback value from a loopback RX signal based on the loopback TX signal, and the restoring further comprises restoring the last good loopback value when the loopback RX signal indicates an outage.

20. A system to synchronize frequency and time with respect to a satellite, the system comprising:
a beacon receiver to receive a beacon signal ($f_{B,TX}^N$) and to calculate a frequency offset ($\hat{f}_{B,e}$) due to an instability of a satellite oscillator from the beacon signal;
an ephemeris module to determine a Satellite Motion Doppler Correction for Ephemeris ($SMDC_e$) of a satellite motion based on ephemeris data for the satellite;
a sync module to compute a Satellite Reference Drift Correction for Ephemeris ($SRDC_e$) based on the frequency offset, the beacon signal and the $SMDC_e$;
a loopback transmitter to set a loopback TX frequency based on the $SRDC_e$ and the $SMDC_e$, and to transmit a loopback TX signal to the satellite at the loopback TX frequency; and
a loopback receiver to receive a loopback RX signal based on the loopback TX signal, and to estimate an uplink frequency offset and a downlink frequency offset from a loopback RX signal based on the loopback TX signal,
wherein the sync module updates a Satellite Reference Drift Correction (SRDC) as SRDC' and a Satellite Motion Doppler Correction (SMDC) as SMDC' using the $SRDC_e$, the $SMDC_e$ and the downlink frequency offset, and
the sync module adjusts traffic channel RX and TX frequencies based on SRDC' and SMDC'.

\* \* \* \* \*